United States Patent
Rollick

(10) Patent No.: US 8,277,892 B2
(45) Date of Patent: Oct. 2, 2012

(54) PROCESS FOR CREATING AN OXYGEN SCAVENGING PARTICLE

(75) Inventor: Kevin L. Rollick, Munroe Falls, OH (US)

(73) Assignee: Multisorb Technologies, Inc., Buffalo, NY (US)

( * ) Notice: Subject to any disclaimer, the term of this patent is extended or adjusted under 35 U.S.C. 154(b) by 462 days.

(21) Appl. No.: 11/678,438

(22) Filed: Feb. 23, 2007

(65) Prior Publication Data

US 2007/0200091 A1 Aug. 30, 2007

Related U.S. Application Data

(60) Provisional application No. 60/777,018, filed on Feb. 25, 2006.

(51) Int. Cl.

| C23C 16/00 | (2006.01) |
|---|---|
| B05D 7/00 | (2006.01) |
| H01J 7/18 | (2006.01) |
| H01J 35/20 | (2006.01) |
| H01K 1/56 | (2006.01) |
| B01D 19/00 | (2006.01) |
| B01D 53/50 | (2006.01) |
| B01D 53/56 | (2006.01) |
| C02F 1/70 | (2006.01) |
| C09K 3/00 | (2006.01) |
| C01B 3/00 | (2006.01) |
| C01B 6/00 | (2006.01) |
| C01B 17/22 | (2006.01) |
| C01B 17/74 | (2006.01) |
| C06B 23/00 | (2006.01) |
| C06B 43/00 | (2006.01) |
| C01C 1/24 | (2006.01) |
| B22F 1/00 | (2006.01) |
| B22F 9/00 | (2006.01) |
| C22C 1/04 | (2006.01) |

(52) U.S. Cl. ........ 427/255.28; 427/216; 252/181.6; 252/188.2; 252/188.28; 423/243.09; 423/532; 423/547; 75/367

(58) Field of Classification Search ............... 252/181.6, 252/188.28, 188.2; 419/19; 75/230, 246, 75/249, 366, 367; 427/216, 255.28; 423/243.09, 423/532, 547

See application file for complete search history.

(56) References Cited

U.S. PATENT DOCUMENTS

| 1,504,813 A * | 8/1924 | Coolbaugh et al. .......... 423/529 |
|---|---|---|
| 2,861,868 A * | 11/1958 | Stites, Jr. et al. .............. 423/520 |
| 3,919,401 A * | 11/1975 | Chay ............................... 423/520 |
| 4,127,503 A | 11/1978 | Yoshikawa et al. |
| 4,166,807 A * | 9/1979 | Komatsu et al. ................ 502/62 |
| 4,384,972 A * | 5/1983 | Nakamura et al. ....... 252/188.21 |
| 4,479,986 A | 10/1984 | Juday |
| 5,744,013 A | 4/1998 | Botts et al. |
| 5,744,056 A | 4/1998 | Venkateshwaran et al. |
| 5,885,481 A | 3/1999 | Venkateshwaran et al. |
| 6,899,822 B2 | 5/2005 | McKedy |
| 2001/0018480 A1 | 8/2001 | Chiang et al. |
| 2004/0094745 A1 | 5/2004 | McKedy |

FOREIGN PATENT DOCUMENTS

| EP | 1050556 A | 11/2000 |
|---|---|---|
| EP | 1506718 A | 2/2005 |
| EP | 1506718 A1 * | 2/2005 |
| JP | 10-131379 A | 11/1999 |
| WO | 2005016762 A | 2/2005 |
| WO | 2006015982 A | 2/2006 |
| WO | 2006089895 A | 8/2006 |

OTHER PUBLICATIONS

Grigoriy Sereda, A Simple and Easy to Learn Chart of the Main Classes of Inorganic Compounds and Their Acid-Base Rections, Journal of Chemical Eduation, vol. 82 No. 11, Nov. 2005, 1645-1648.*

* cited by examiner

*Primary Examiner* — Harold Pyon
*Assistant Examiner* — Tanisha Diggs
(74) *Attorney, Agent, or Firm* — Stephen B. Salai, Esq.; Paul A. Leipold, Esq.; Harter Secrest & Emery LLP

(57) ABSTRACT

A method is disclosed for manufacturing one or more oxygen scavenging particles, wherein the particle(s) comprises an oxidizable metal particle, such as elemental iron; an acidifying electrolyte such as sodium or potassium bisulfate and optionally a water hydrolysable Lewis acid, such as aluminum chloride. The method comprises the step of coating the oxidizable particle with a first compound and then reacting the first compound with a second compound to form a third compound, wherein the third compound promotes the reaction of the oxidizable particle with oxygen.

12 Claims, No Drawings

PROCESS FOR CREATING AN OXYGEN SCAVENGING PARTICLE

This patent application claims the benefit of the priority of U.S. Provisional Patent Application Ser. No. 60/777,018 filed Feb. 25, 2006. The teachings of this provisional patent application are incorporated herein by reference.

FIELD OF THE INVENTION

This invention relates to manufacturing methods of oxygen scavenging particles having utility in packaging. In particular, these compositions are suitable for being incorporated into film-forming polymers, subsequently used to make at least one layer of the wall of a container. This invention also has applicability in sachets, scavenging caps and chemical heating pads.

BACKGROUND OF THE INVENTION

Products sensitive to oxygen, particularly foods, beverages and medicines, deteriorate or spoil in the presence of oxygen. One approach to reducing these difficulties is to package such products in a container comprising at least one layer of a "passive" gas barrier film that acts as a physical barrier and reduces or eliminates the transmission of oxygen through the container wall but does not react with oxygen.

Another approach to achieving or maintaining a low oxygen environment inside a package is to use a packet containing a rapid oxygen absorbent material. The packet, also referred to as a pouch or sachet, is placed in the interior of the package along with the product. The oxygen absorbent material in the sachet protects the packaged product by reacting with the oxygen before the oxygen reacts with the packaged product.

Although oxygen absorbents or scavenger materials used in packets react chemically with the oxygen in the package, they do not prevent external oxygen from penetrating into the package. Therefore, it is common for packaging using such packets to include additional protection such as wrappings of passive barrier films of the type described above. Not only are sachets difficult to use with liquids, they add to product costs.

In view of the packet or sachet's disadvantages and limitations, it has been proposed to incorporate an "active" oxygen absorbent, i.e. one that reacts with oxygen, directly into the walls of a packaging article. Because such a packaging article is formulated to include a material that reacts with the oxygen permeating through its walls, the package is said to provide an "active-barrier" as distinguished from a passive barrier that merely blocks the transmission of oxygen but does not react with it. Active-barrier packaging is an attractive way to protect oxygen-sensitive products because it not only prevents oxygen from reaching the product from the outside, it can also absorb oxygen present within a container wall, and absorb the oxygen introduced during the filling of the container.

One approach for obtaining active-barrier packaging is to incorporate a mixture of an oxidizable metal (e.g., iron) and an activating composition which promotes the reaction of the metal with oxygen, often in the presence of water, into a suitable film-forming polymer. Examples of activating compositions are electrolytes (e.g., sodium chloride), acidifying components, electrolytic acidifying component, or protic solvent hydrolysable halogen compounds like Lewis acids (e.g. aluminum chloride). The scavenger containing film forming polymer is then melt processed into a monolayer or multilayer article such as a preform, bottle, sheet or film that eventually forms the resulting oxygen scavenger-containing wall or walls of the rigid or flexible container or other packaging article. It will be understood that a film-forming polymer is one that is capable of being made into a film or sheet. The present invention is not, however, limited to films and sheets. Examples of such film forming polymers are polyamides, polyethylenes, polypropylenes, and polyesters.

The container utilizing the scavengers include bottle walls, trays, container bases, or lids. It should be appreciated that references to the container sidewall and container wall also refer to the lid, bottom and top sides of the container, and a film that may be wrapped around the product such as meat wraps.

One difficulty with scavenger systems incorporating an oxidizable metal or metal compound and an electrolyte into a thermoplastic layer is the inefficiency of the oxidation reaction. High loading of scavenger compositions and relatively large amounts of electrolyte are often used to obtain sufficient oxygen absorption scavenging rate and capacity in active-barrier packaging.

According to U.S. Pat. No. 5,744,056, oxygen-scavenging compositions that exhibit improved oxygen-absorption efficiency relative to systems such as iron and sodium chloride are obtainable by including a non-electrolytic, acidifying component in the composition. In the presence of moisture, the combination of the electrolyte and the acidifying component promotes the reactivity of metal with oxygen to a greater extent than does either alone. However, the acidifying component when used alone does not exhibit sufficient oxygen-scavenging properties.

A particularly preferred oxygen-scavenging composition according to the U.S. Pat. No. 5,744,013 comprises iron powder, sodium chloride and sodium acid pyrophosphate, in amounts from about 10 to 150 parts by weight of sodium chloride plus sodium acid pyrophosphate per hundred parts by weight iron.

These conventional scavenging compositions are created by dry blending the ingredients or depositing the acidifying agents and salts onto the metal particle out of an aqueous liquid or slurry.

U.S. Pat. No. 5,744,056 teaches that the degree of mixing of the oxidizable metal, electrolyte and acidifying components and, if used, optional binder component has been found to affect oxygen absorption performance of the oxygen-scavenging compositions, with better mixing leading to better performance. Mixing effects are most noticeable at low electrolyte plus acidifying components to oxidizable metal component ratios and at very low and very high acidifying component to electrolyte component ratios. Below about 10 parts by weight electrolyte plus acidifying components per hundred parts by weight metal component, or when the weight ratio of either the electrolyte or acidifying component to the other is less than about 10:90, the oxygen scavenger components are preferably mixed by aqueous slurry mixing followed by oven drying and grinding into fine particles. Below these ratios, mixing by techniques suitable at higher ratios, such as by high-intensity powder mixing, as in a Henschel mixer or a Waring powder blender, or by lower intensity mixing techniques, as in a container on a roller or tumbler, may lead to variability in oxygen uptake, particularly when the compositions are incorporated into thermoplastic resins and used in melt processing operations. Other things being equal, U.S. Pat. No. 5,744,056 teaches that oxygen-scavenging compositions prepared by slurry mixing have the highest oxygen absorption efficiency or performance, followed in order by compositions prepared using high intensity solids mixers and roller/tumbler mixing techniques.

U.S. Pat. No. 4,127,503 teaches the dissolution of an electrolyte in water, contacting the solution with the oxidizable component (e.g. iron) and then removing the water from the composition. While this technique is suitable for salts which dissolve into water, it is not suitable for salts which hydrolyze in the presence of a protic solvent, such as water. Aluminum chloride for instance, will hydrolyze in the presence of water to hydrochloric acid and aluminum hydroxide.

WO 2005/016762 filed on Aug. 11, 2004 teaches that certain protic solvent hydrolysable activating compositions can be placed onto the oxidizable component by dissolving the activating composition into an essentially moisture free organic solution, contacting the solution with the oxidizable metal then removing the solvent.

Japanese Patent No. 11-302706, titled "Iron Powder For Reactive Material and Its Production" teaches placing an enveloping layer containing 0.1-2% of the weight of chlorine in the iron powder which the enveloping layer which becomes a front face of [sic] ferric chloride by contacting hot chlorine or hydrogen chloride gas to iron powder. This way the ferric chloride is made to form in the front face of said iron powder.

This vapour phase-solid phase reaction limits one to the reaction products of iron and various gasses. Because this particular disclosure requires that the oxidizing agent be a reaction product of iron, the practitioner is limited by the kinetics of the iron based salts and iron. Dissimilar metals such as aluminum chloride and iron are not available with this technique.

WO 2006/015982A2 teaches that the protic solvent hydrolysable activating composition can be deposited upon the oxidizable metal from the vapour stream.

U.S. Pat. No. 6,899,822 teaches the use of an acidifying electrolyte such as sodium bisulfate in the presence of sodium chloride and iron. In this case the electrolyte dissolves into the water as opposed to reacting or being hydrolyzed by the water into a different entity.

SUMMARY OF THE INVENTION

This specification describes a method for creating an oxygen scavenging particle comprising the steps of
(A) depositing a first compound which is a precursor compound onto an oxidizable particle; wherein said first compound is capable of being reacted with a second compound which is a reactive compound to form a third compound which is an acidifying electrolyte wherein the third compound is capable of initiating the reaction of the oxidizable particle with oxygen;
(B) exposing said oxidizable particle with the deposited first compound to the second compound under conditions sufficient for said second reactive compound to react with the first compound to form the third compound which is capable of initiating the reaction of the oxidizable particle with oxygen when the oxidizable particle and the third compound are exposed to water.

It is further disclosed the first compound is a metal hydroxide which could be selected from the group consisting of sodium hydroxide and potassium hydroxide and that the second compound is $SO_3$.

An additional step is also disclosed wherein the particle with the acidifying electrolyte is exposed to a further step wherein a water hydrolysable Lewis acid is deposited upon the oxidizable particle. It is further disclosed that the water hydrolysable Lewis acid is selected from the group consisting of titanium tetrachloride, tin tetrachloride, and $POCl_3$, $SOCl_2$, $SCl_2$, $S_2Cl_2$, $PCl_3$, $PSCl_3$, $PBr_3$, $POBr_3$, $PSBr_3$, $PCl_5$, $PBr_5$, $SiCl_4$, $GeCl_4$, $SbCl_5$, $AlCl_3$, $FeCl_2$, $FeCl_3$, $AlBr3$, $SbCl_3$, $SbBr_3$, and $ZrCl_4$.

Also disclosed is a method for creating an oxygen scavenging particle comprising the steps of
(A) depositing a first compound onto an oxidizable particle; wherein said first compound is capable of being reacted with a second compound to form a third compound wherein said third compound is capable of be reacted with a fourth compound to form a fifth compound wherein the fifth compound is an acidifying electrolyte capable of initiating the reaction of the oxidizable particle with oxygen;
(B) exposing said oxidizable particle with the deposited the first compound to the second compound under conditions sufficient for said second compound to react with said first compound to form the third compound
(C) exposing said oxidizable particle with the third compound to the fourth compound under conditions sufficient for said third compound to react with the fourth compound and form the fifth compound which is an acidifying electrolyte capable of initiating the reaction of the oxidizable particle with oxygen when the oxidizable particle and the third compound are exposed to water.

An additional step is also disclosed wherein the particle with the acidifying electrolyte is exposed to a further step wherein a water hydrolysable Lewis acid is deposited upon the oxidizable particle. It is further disclosed that the water hydrolysable Lewis acid is selected from the group consisting of titanium tetrachloride, tin tetrachloride, and $POCl_3$, $SOCl_2$, $SCl_2$, $S_2Cl_2$, $PCl_3$, $PSCl_3$, $PBr_3$, $POBr_3$, $PSBr_3$, $PCl_5$, $PBr_5$, $SiCl_4$, $GeCl_4$, $SbCl_5$, $AlCl_3$, $FeCl_2$, $FeCl_3$, $AlBr3$, $SbCl_3$, $SbBr_3$, and $ZrCl_4$.

DETAILED DESCRIPTION OF THE INVENTION

It is believed that the deficiencies of dry blending can be overcome by manufacturing an oxygen scavenging composition comprising an oxidizable component, preferably an oxidizable metal a reduced valence state such as iron, cobalt, aluminum, copper, zinc, manganese, and magnesium with an acidifying electrolyte in the manner according to this disclosure.

A typical oxygen scavenging system will contain an oxidizable component, such as an oxidizable metal, and an activating composition. The activating composition may be on compound or many compounds that promote or initiate the reaction of the oxidizable component with oxygen. In the absence of the activating composition, there is little or no reaction of the oxidizable component with oxygen. The test therefore is whether the oxidizable metal reacts with more oxygen in a given period of time in the presence of the activating composition than when the activating component is absent. In the case of a triggerable system, such as requiring those requiring water, the rate of oxygen consumption of the composition comprising the activating composition, the oxidizable metal and water is compared with the rate of oxygen consumption of the oxidizable metal and water.

For clarity, the component(s) of the activating composition need not be the actual compound that participates in or catalyzes the reaction with oxygen, but may participate in a reaction which produces a compound which does participate in or catalyze the reaction with water. For example in the case of the water hydrolysable Lewis acid, aluminium chloride, it is believed that the aluminum chloride reacts with the water to form hydrochloric acid and it is the hydrochloric acid which actually promotes the reaction of the metal with the oxygen.

Another hypothesis is that the hydrochloric acid reacts to form iron chloride, which is a known activator of the reaction of oxygen with oxidizable metals.

It is therefore considered preferable that the activating composition initiate the reaction of the oxidizable metal in the presence of water. This will make the composition triggerable. A container with such a composition will not react with oxygen until filled and the water of the packaged goods migrates into the wall of the container initiating the reaction of the oxidizable component with oxygen in the wall of the container.

The phrase initiate the reaction of oxygen with the oxidizable metal means that when in the presence of water and the activating composition, the oxidizable metal becomes more reactive with oxygen than it would be in the presence of water without the activating composition.

For the reaction with oxygen to be initiated by water contact, it is essential that this composition promote the reaction in the presence of moisture. The moisture can come from direct contact with the liquid or absorption from the surrounding air or vapour. Requiring water is what makes the composition triggerable.

In a typical application, the water, the protic solvent, will come from the packaged goods, such as beer or juice. When the composition is bound in the walls of a container, the water migrates from the packaged goods to the composition initiating the reaction of the oxidizable component with the oxygen that passes from the outside of the wall to the inside.

To be triggerable, the activating composition should comprise an acidifying electrolyte and optionally a protic solvent (e.g. water) hydrolysable compounds, such as a Lewis acid. Of the protic solvent hydrolysable compounds, those with halogens such as chlorine and bromine are preferred.

U.S. Pat. No. 5,885,481, the teachings of which are incorporated by reference herein, teaches the advantages of using a non-halogenated acidifying electrolytic component. The following are believed to be suitable non-halogenated compounds and include various electrolytic inorganic acids and their salts such as sulfamic acid, zinc sulfate, ferrous sulphate, sodium bisulfate, potassium bisulfate, ammonium bisulfate, ammonium sulfite, ammonium bisulfite, and sodium bisulfite. Combinations of such materials might also be used. It is believed that sodium or potassium bisulfate ($NaHSO_4$, $KHSO_4$) would be particularly effective acidifying electrolytes which can be made according to the method described.

This method involves knowing that the acidifying electrolyte can be formed by the reaction of two compounds, preferably a solid and a non-solid (liquid or gas). The solid needs to be soluble in a solvent or capable of being vapour deposited from the gas phase onto the oxidizable particle.

The solid which is first deposited either from a liquid or gas phase is known as the first compound, or precursor compound. The following example based upon sodium bisulfate and potassium bisulfate will illustrate the method. Sodium bisulfate is the reaction product of sulphuric acid and sodium hydroxide and it is proposed that one could react sulphuric acid with sodium hydroxide in the presence of particles of the oxidizable component, remove the water, and the oxidizable particles have been deposited with sodium bisulfate. This reaction is difficult in that the water or sulphuric acid often attacks the oxidizable metal.

However, according to this method one would first deposit the first compound, or precursor, as a metal hydroxide onto the oxidizable particle from solution. This would be readily accomplished by dissolving the respective precursor (NaOH, KOH) into water or another suitable solvent and placing the oxidizable particles into the solution. The solvent can then be removed by reducing the pressure or heating the vessel containing the dissolved compound, solvent, and oxidizable particles. The vessel should preferably be rotated to provide mixing.

In the case of where the oxidizable particles are highly porous, such as sponge iron or other powdered metals, reducing the pressure would remove the oxygen and force the solution into the pores of the iron, something which is not done during dry blending. A small surfactant may be added to overcome any surface tension inhibitions experienced by the solution.

Using a spray drier is another way of depositing a thin coating of the first compound onto the oxidizable particles.

Deposition from solution onto the iron may also be accomplished according to the following technique as described in U.S. Pat. No. 5,416,159, the teachings of which are incorporated in their entirety.

One method is the "dry vacuum-pressure" method in which metal particles are placed in a closed vessel and the vessel is subjected to a vacuum (such as 2 to 10 Torr for 10 to 15 minutes) to cause air entrapped in any pores in the dry articles to escape. The liquid with the dissolved compound is drawn from a reservoir into the vessel so as to cover and fill the pores of the particle. The vacuum is then released and pressure is applied to the liquid sealant level (such as air at 100 psi for 10 to 15 minutes) to drive the solution further into the pores. Following this, the excess solution is drained and the particles are dried.

Another deposition method is a "dry vacuum" process in which metal particles are placed in a closed vessel and the vessel is subjected to a vacuum (e.g. 2 to 10 Torr for 10 to 15 minutes) to cause air entrapped in any pores in the particles to escape. The particles are then submerged in or flooded by the liquid solution, so as to cover the particles and fill the pores and allowed to "soak" for 10 to 15 minutes at atmospheric pressure, following which the excess solution is drained and the particles are dried.

An efficient dry vacuum apparatus is described in my U.S. Pat. No. 4,479,986, issued Oct. 30, 1984, the disclosure of which is incorporated herein for a more detailed description of a dry vacuum impregnation process.

Another commonly practiced technology for impregnation of metal particles is the so-called "wet vacuum" process that includes the steps of submerging the particles in a bath of liquid solution in an enclosed impregnation tank, and then evacuating the tank to a sufficiently low vacuum (e.g. 2 to 10 Torr for 10 to 15 minutes) to enable most of the air entrapped in pores in the particles to escape so that the pores can be filled with liquid solution. The vacuum in the impregnating tank is then released and the particles are transferred to a tank in which the excess solution is allowed to drain off and the particles are dried.

After the solvent is driven off the oxidizable particles, preferably elemental metal particles, should now be coated with the first compound, in this case the metal oxide (NaOH, KOH). The particles would then be exposed the second compound, called the reactive compound. The reactive compound is the compound which will react with the compound or compounds on the surface of the oxidizable particle form the acidifying electrolyte. It is important to note that the reactive compound is not necessarily reactive with the first compound or precursor compound. In most cases it should be, but it is conceivable that one could place the first compound on the oxidizable particle, react it with a second compound and then react that intermediary with the reactive compound to produce the acidifying electrolyte.

In the case of the making the bisulfate with the metal hydroxide precursor, one could use $SO_3$ as the reactive compound to react with the metal hydroxide oxide to form the respective bisulfate.

The exposure of the oxidizable component with the deposited precursor compound to the second compound, or reactive compound, $SO_3$ can be done in many ways known in the art. One way is to heat the $SO_3$ and place it in the vapour stream and pass the vapour over the particles for sufficient time until the desired amount of bisulfate has been produced on the surface of the oxidizable component. The $SO_3$ could be mixed with nitrogen so that the oxidizable particle could be fluidized so as to prevent sticking and agglomeration during the reaction. If one used sponge iron, the reaction of the precursor metal hydroxide with the $SO_3$ would occur in the pores as well, placing the bisulfate into areas where it cannot be placed using a dry blend.

Another way to expose the oxidizable particles with the compound to be reacted with the reactive compound is to place the particles in a liquid containing the reactive compound. For instance, the $SO_3$ could be maintained as a liquid. One could bubble nitrogen through the liquid to keep the particles separated.

The above process should work with any acidifying electrolyte since by definition an acidifying electrolyte comprises at least one solid compound that produces an acidic pH, i.e., less than 7, in dilute aqueous solution and substantially disassociates into positive and negative ions in the presence of moisture and promotes reactivity of the oxidizable component with oxygen. Like the oxidizable metal component, the acidifying electrolyte component should be capable of being used in packaging without adversely affecting products to be packaged. For applications in which the invented compositions include or are used with a thermoplastic resin, the component also should have sufficient thermal stability to withstand melt compounding and processing.

The exposure to the reactive compound or any intermediate compound which might interact must be done at sufficient temperature and pressure (or vacuum) to cause the reaction of the deposited compound with the reacting compound. In the case of $SO_3$ and sodium or potassium hydroxide, the temperature of 100° C. should suffice. The pressure is sufficiently low to keep the $SO_3$ in the vapour phase at the desired temperature. The exposure time is empirically determined based upon the time required to form a sufficient amount of the desired reaction product.

The preferred amounts of the acidifying electrolyte is in the range of between the molar equivalent of 5 percent by weight sodium bisulfate to the molar equivalent of 17 percent by weight sodium bisulfate relative to the weight of the sodium bisulfate plus iron. It is believed that by using this method that molar equivalents as low as 1-2 percent by weight sodium bisulfate will be effective.

The following table shows possible precursors and reactive components for respective acidifying electrolytes.

TABLE I

| POSSIBLE NON-EXHAUSTIVE LIST REACTION SCHEMES | | | |
|---|---|---|---|
| ACIDIFYING ELECTROLYTE | PRECURSOR | REACTIVE COMPONENT | NOTES |
| $NaHSO_4$ | NaOH | $SO_3$ | |
| $NaHSO_4/NaCl$ | NaOH | $SO_2Cl_2$ | |
| $NaHSO_3$ | NaOH | $SO_2$ | |
| $NaHSO_3/NaCl$ | NaOH | $SOCl_2$ | |
| $LiHSO_4$ | LiOH | $SO_3$ | |
| $LiHSO_4/LiCl$ | LiOH | $SO_2Cl_2$ | |
| $LiHSO_3$ | LiOH | $SO_2$ | |
| $LiHSO_3/LiCl$ | LiOH | $SOCl_2$ | |
| $KHSO_4$ | KOH | $SO_3$ | |
| $KHSO_4/KCl$ | KOH | $SO_2Cl_2$ | |
| $KHSO_3$ | KOH | $SO_2$ | |
| $KHSO_3/KCl$ | KOH | $SOCl_2$ | |
| $RbHSO_4$ | RbOH | $SO_3$ | |
| $RbHSO_4/RbCl$ | RbOH | $SO_2Cl_2$ | |
| $RbHSO_3$ | RbOH | $SO_2$ | |
| $RbHSO_3/RbCl$ | RbOH | $SOCl_2$ | |
| $CsHSO_4$ | CsOH | $SO_3$ | |
| $CsHSO_4/CsCl$ | CsOH | $SO_2Cl_2$ | |
| $CsHSO_3$ | CsOH | $SO_2$ | |
| $CsHSO_3/CsCl$ | CsOH | $SOCl_2$ | |
| $CaSO_3/CaCl2$ | $Ca(OH)_2$ | $SOCl_2$ | sulfate/bisulfate not practical; bisulfite only known in soln. |
| $ZnSO_4$/sulfamic acid | $ZnO \cdot n(NH_3)$ | $SO_3$ | |
| $ZnSO_4$/sulfamic acid | $Zn(OH)_2 \cdot n(NH_3)$ | $SO_3$ | |
| $NaHSO_4$ | $NaHCO_3$ | $SO_3$ | $CO_2$ evolved |
| $LiHSO_4$ | $LiHCO_3$ | $SO_3$ | $CO_2$ evolved |
| $KHSO_4$ | $KHCO_3$ | $SO_3$ | $CO_2$ evolved |
| $RbHSO_4$ | $RbHCO_3$ | $SO_3$ | $CO_2$ evolved |
| $CsHSO_4$ | $CsHCO_3$ | $SO_3$ | $CO_2$ evolved |
| $NH_4HSO_4$ | $NH_4HCO_3$ | $SO_3$ | $CO_2$ evolved |
| $NH_4HSO_4(+NH_4Cl)$ | $NH_4HCO_3$ | $SO_2Cl_2$ | $CO_2$ evolved depending on temperature, sulfamic acid may be formed instead of $NH_4Cl$) |
| $NH_4HSO_3$ | $NH_4HCO_3$ | $SO_2$ | $CO_2$ evolved |
| $NH_4HSO_3(+NH_4Cl)$ | $NH_4HCO_3$ | $SOCl_2$ | $CO_2$ evolved (depending on temperature, sulfamic acid may be formed instead of $NH_4Cl$) |

TABLE I-continued

POSSIBLE NON-EXHAUSTIVE LIST REACTION SCHEMES

| ACIDIFYING ELECTROLYTE | PRECURSOR | REACTIVE COMPONENT | NOTES |
|---|---|---|---|
| $(NH_4)2SO_4$ | $(NH_4)_2CO_3$ | $SO_3$ | $CO_2$ evolved |
| $(NH_4)2SO_3$ | $(NH_4)_2CO_3$ | $SO_2$ | $CO_2$ evolved |
| $MSO_4$ (Where M is a metal such as Zn, Fe, Mn, Cu, etc) | $M(OAc)_n$ | $SO_3$ | acetic anhydride evolved |
| $MSO_4$ (Zn, Fe, Mn, Cu, etc) | $M(NO_3)_n$ | $SO_3$ | $N_2O_5$ evolved |
| $MHS_2O_3$ (Where M is Li, K, Rb, Cs.) | NaSH | $SO_3$ | half salt of thiosulfate |
| $M_2S_2O_3$ (Where M is Li, K, Rb, Cs.) | $Na_2S$ | $SO_3$ | sodium thiosulfate |

The resulting oxidizable component/sodium bisulfate particle can then be further optionally processed by having the water hydrolysable Lewis Acid, such as aluminum chloride, deposited upon it from the vapour phase as described below.

Many protic solvent hydrolysable compounds such as titanium tetrachloride, tin tetrachloride, and $POCl_3$, $SOCl_2$, $SCl_2$, $S_2Cl_2$, $PCl_3$, $PSCl_3$, $PBr_3$, $POBr_3$, $PSBr_3$, $PCl_5$, $PBr_5$, $SiCl_4$, $GeCl_4$, $SbCl_5$ are liquids at room temperature and readily boil. Other protic solvent hydrolysable compounds such as $AlCl_3$, $FeCl_2$, $FeCl_3$, AlBr3, $SbCl_3$, $SbBr_3$, and $ZrCl_4$ sublime at relatively low temperatures.

Preferred protic solvent hydrolysable halogen compounds are the halides, in particular chloride and bromide, more preferably $AlCl_3$, $AlBr_3$, $FeCl_2$ $FeCl_3$, $FeBr_2$, $FeBr_3$, $TiCl_4$, $SnCl_4$, and $POCl_3$.

A preferred embodiment of this method is to use the various deposition techniques to create a unitary particle of the composition. For example, WO 2006/015982A2, the teachings of which are incorporated in its entirety, teaches how one component of the activating composition could be deposited onto the oxidizable component from the vapour phase.

Aluminum chloride could also be deposited from an organic solvent, such as ethanol. Provided of course, that such solvent did not dissolve the acidifying electrolyte from the particle. Aluminum chloride is the preferred water hydrolysable Lewis acid in the amount deposited on the elemental iron ranging from 10 to 400 parts aluminum chloride to 1000 parts elemental iron. For the vapour deposited aluminum chloride, 50-100 parts of aluminum chloride per 1000 parts elemental iron was determined to be optimum.

The amount of aluminum chloride is expected to be higher for dry blends of activating composition with iron.

For either the deposition process or the dry blend, the preferred amounts of the protic solvent hydrolysable Lewis acid is in the range of between the molar equivalent of 5 percent by weight aluminum chloride to the molar equivalent of 40 percent by weight aluminum chloride relative to the weight of the aluminum chloride plus iron.

As described in WO 2006/015982A2, the vapour deposition process requires two quasi-unit operations. The first unit operation, or step, is contacting the oxidizable component with the vapour phase containing at least one component of the activating composition. The next unit operation, or second step, is the vapour deposition wherein the component of the activating composition is condensed or de-sublimed as a liquid or solid onto the oxidizable component.

In general, one component of the activating composition is placed into a vapour stream by either boiling, flashing or subliming the activating composition by manipulating temperature and/or pressure. The vaporized activating composition is contacted with the oxidizable particles and once in contact with the oxidizable particle, the activating composition is deposited from the vapour stream onto the oxidizable component through condensation or de-sublimation.

It should be noted that the process is best carried out in an oxygen and moisture free environment. Also, because of the intimacy of contact, the required amount of activating composition is substantially less than prior art indications. The desired ratio of activating composition to oxidizable component can readily be determined by trial and error without undue experimentation. One merely makes various particles with differing levels of the activating composition and ratios analyzes the results and increases or decreases the amount of components in the activating composition to achieve the desired oxygen scavenging activity.

It is also noted that the oxidizable component could be several compounds, or alloys of compounds. Additionally, the activating composition is also not limited to just one compound. Additional agents such as binders and water absorbers can be placed on the oxidizable particle first and the particle subjected to vapour deposition.

Once the composition is created it can be dispersed into a film forming polymer matrix. After dispersion of the vapour deposited oxygen scavenging particle into the polymer matrix, every polymer void or capsule containing a particle with the oxidizable component will also contain an activating composition. In contrast, when a dry blend of the activating and oxidizable components is incorporated into the polymer matrix the separate particles are often not in the same vicinity and the polymer separating the salt from the iron creates a barrier that renders the particle virtually ineffective as an oxygen scavenger.

The oxidizable particles preferably have an average particle size less than 50 μm, with less than 45 μm, even more preferred, and less than 32 μm more preferred and less than 25 μm, the most preferred. It is even possible to use nano-metals. The nano-rust could be reduced as described in WO2006/015982, the treated with the precursor, followed by exposure to the reactive component.

Iron is the preferred metal based upon cost. While the electrolytic reduced unannealed or annealed iron is preferred, carbonyl iron and carbon monoxide or hydrogen reduced sponge irons are also suitable. It should be noted that hydrogen and carbon monoxide reduced forms of iron are generally less reactive than the electrolytic reduced iron. It is also not necessary for the oxidizable component to be in elemental (0 valence state) form. For example, compounds with Fe (II) are considered suitable for use in this method.

While iron is the preferred oxidizable component for cost reasons, cobalt, tin, copper, magnesium, manganese, aluminum and zinc are all candidates for the process of this invention. The practioner should note that magnesium, aluminum and zinc will require special techniques for the deposition since they are likely to react with water or the hydroxide.

The oxidizable component, particularly the metals, does not need to be 100% pure. Minor alloying elements such as nickel, chromium, silicon and other compounds can be present. Using iron as an example, the mixtures of iron with minor amounts of other metals can be used. The iron based scavenging compositions are incorporated into the wall of a container made from film-forming polymers, preferably aromatic polyester, in amounts from 500 to 10000 parts by weight per million parts by weight polymer, preferably 1000 to 6000 parts per million parts polymer. For aesthetic reasons, the maximum allowable amount may be 3500 to 5000 parts scavenging composition per million parts film-forming polymer. In the case of nano-scale scavengers, 200-2000 ppm may be sufficient. When used in non-transparent packaging, the amounts of scavenging composition can go as high as 5 weight percent of the total polymer plus scavenging composition (95 grams polymer, 5 grams scavenging composition).

The method will find use in making particles to be used in film forming polymers. Of the film forming polymers, polyester is preferred. Other examples of film forming polymers are the polyamides, the polypropylenes, polyethylenes, and polyvinyl chlorides. Suitable polyesters include those produced from aromatic, aliphatic or cycloaliphatic dicarboxylic acids of from 4 to about 40 carbon atoms and aliphatic or alicyclic glycols having from 2 to about 24 carbon atoms.

A film forming polymer is a polymer whose melt viscosity is equal to or greater than the melt viscosity of polyethylene terephthalate having an intrinsic viscosity of 0.45 dl/g, an intermediate feed I.V. of 0.49 to 0.59 dl/g, or more preferably 0.52 to 0.56 dl/g.

The polymer could be a polyester bottle resin of feed I.V. ranging from 0.59 to 0.69 dl/g, more preferably 0.61 to 0.64 dl/g, with a typical I.V. for bottles ranging from 0.72 to 0.84 dl/g, more preferably 0.74 to 0.82 dl/g. For packaging trays the typical I.V. ranges from 0.60 to 1.50 dl/g, more preferably from 0.89 to 0.95 dl/g. It is noted that while the measured I.V. of a polymer is a single value, that value represents the composite of the various molecule chain lengths Polyesters employed can be prepared by conventional polymerization procedures well known in the art. The polyester polymers and copolymers may be prepared, for example, by melt phase polymerization involving the reaction of a diol with a dicarboxylic acid, or its corresponding diester. Various copolymers resulting from use of multiple diols and diacids may also be used. Polymers containing repeating units of only one chemical composition are homopolymers. Polymers with two or more chemically different repeat units in the same macromolecule are termed copolymers. The diversity of the repeat units depends on the number of different types of monomers present in the initial polymerization reaction. In the case of polyesters, copolymers include reacting one or more diols with a diacid or multiple diacids, and are sometimes referred to as terpolymers.

As noted hereinabove, suitable dicarboxylic acids include those comprising from about 4 to about 40 carbon atoms. Specific dicarboxylic acids include, but are not limited to, terephthalic acid, isophthalic acid, naphthalene 2,6-dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Specific esters include, but are not limited to, the various isomeric phthalic and naphthalic diesters.

These acids or esters may be reacted with an aliphatic diol preferably having from about 2 to about 24 carbon atoms, a cycloaliphatic diol having from about 7 to about 24 carbon atoms, an aromatic diol having from about 6 to about 24 carbon atoms, or a glycol ether having from 4 to 24 carbon atoms. Suitable diols include, but are not limited to ethylene glycol, 1,4-butenediol, trimethylene glycol, 1,6-hexanediol, 1,4-cyclohexanedimethanol, diethylene glycol, resorcinol ethoxy ethyl ether, and hydroquinone ethoxy ethyl ether.

Polyfunctional comonomers can also be used, typically in amounts of from about 0.05 to about 3 mole percent. Suitable comonomers include, but are not limited to, trimellitic anhydride, trimethylolpropane, pyromellitic dianhydride (PMDA), and pentaerythritol. Polyester-forming polyacids or polyols can also be used. Blends of polyesters and copolyesters may also be useful in the present invention.

One preferred polyester is polyethylene terephthalate (PET) formed from the approximate 1:1 stoichiometric reaction of terephthalic acid, or its ester, with ethylene glycol. Another preferred polyester is polyethylene naphthalate (PEN) formed from the approximate 1:1 to 1:1.6 stoichiometric reaction of naphthalene dicarboxylic acid, or its ester, with ethylene glycol. Yet another preferred polyester is polybutylene terephthalate (PBT). Copolymers of PET, copolymers of PEN, and copolymers of PBT are also preferred. Specific copolymers and terpolymers of interest are PET with combinations of isophthalic acid or its diester, 2,6 naphthalic acid or its diester, and/or cyclohexane dimethanol.

The esterification or polycondensation reaction of the carboxylic acid or ester with glycol typically takes place in the presence of a catalyst. Suitable catalysts include, but are not limited to, antimony oxide, antimony triacetate, antimony ethylene glycolate, organomagnesium, tin oxide, titanium alkoxides, dibutyl tin dilaurate, and germanium oxide. These catalysts may be used in combination with zinc, manganese, or magnesium acetates or benzoates. Catalysts comprising antimony are preferred. Another preferred polyester is polytrimethylene terephthalate (PTT). It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. Isophthalic acid and sebacic acid are an example of simultaneously using an aromatic and aliphatic acid to make a copolymer.

Preferred catalysts for preparing PTT include titanium and zirconium compounds. Suitable catalytic titanium compounds include, but are not limited to, titanium alkylates and their derivatives, titanium complex salts, titanium complexes with hydroxycarboxylic acids, titanium dioxide-silicon dioxide-co-precipitates, and hydrated alkaline-containing titanium dioxide. Specific examples include tetra-(2-ethylhexyl)-titanate, tetrastearyl titanate, diisopropoxy-bis(acetylacetonato)-titanium, di-n-butoxy-bis(triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are titanium tetrabutylate and titanium tetraisopropylate. The corresponding zirconium compounds may also be used.

The polymer using this invention may also contain small amounts of phosphorous compounds, such as in the form of phosphate or phosphite, and a catalyst such as a cobalt compound, that tends to impart a blue hue.

The melt phase polymerization described above may be followed by a crystallization step, then a solid phase polymerization (SSP) step to achieve the intrinsic viscosity necessary for the manufacture of certain articles such as bottles. The crystallization and polymerization can be performed in a tumbler dryer reaction in a batch-type system.

In many cases, it is advantageous to incorporate the scavenger immediately following the melt polymerization step and subjecting the polymer containing the scavenger to the solid phase polymerization.

Alternatively, the crystallization and polymerization can be accomplished in a continuous solid state process whereby the polymer flows from one vessel to another after its predetermined treatment in each vessel. The crystallization conditions preferably include a temperature of from about 100° C. to about 150° C. The solid phase polymerization conditions preferably include a temperature of from about 200° C. to about 232° C., and more preferably from about 215° C. to about 232° C. The solid phase polymerization may be carried out for a time sufficient to raise the intrinsic viscosity to the desired level, which will depend upon the application. For a typical bottle application, the preferred intrinsic viscosity is from about 0.65 to about 1.0 deciliter/gram, as determined by ASTM D-4603-86 at 30° C. in a 60/40 by weight mixture of phenol and tetrachloroethane. The time required to reach this viscosity may range from about 8 to about 21 hours.

In one embodiment of the invention, the film-forming polymer of the present invention may comprise recycled polymers, such as post-consumer or post-industrial polyester or materials derived from recycled polyester, such as polyester monomers, catalysts, and oligomers. Examples of other film-forming polymers include polyamides, polycarbonate, PVC and polyolefins such as polyethylene and polypropylene.

The oxygen-scavenging compositions can be added directly to the thermoplastic polymer compounding or melt-fabrication operation, such as the extrusion section thereof, after which the molten mixture can be advanced directly to the article-fabrication line.

Alternatively, the compositions can be compounded into masterbatch concentrate pellets, which can be further incorporated into packaging polymers for further processing into the desired article.

The concentrates in polyester resins preferably contain more than 20 parts of oxygen-scavenging composition per hundred parts of resin, but the concentrates could contain as low as 5 to 10 parts per hundred. Containers having at least one wall incorporating the oxygen-scavengers of the present invention are the preferred articles. Cups, pouches, boxes, bottles, lids and wrapped films are also examples of such walls. Stretched and unstretched films are included in the definition of container walls.

It is also contemplated to provide articles, with both active and passive oxygen barrier properties through use of one or more passive gas barrier layers in conjunction with one or more layers according to the invention. Alternatively, the passive barrier and oxygen scavenging composition may both be in the same layer.

Analytical Procedures
Accelerated Oxygen Absorbance Test—Polymer Samples

Bottle sidewall samples of the iron-containing compositions are cut to a predetermined size with a template and the sidewall sample weights are recorded to the nearest 0.01 g. The samples are placed into 20 ml gas chromatograph vials. The vials are either analysed dry or with activation. Activated (wet) samples are activated by placing 2 ml of aqueous 0.001 M acetic acid into the vial prior to being crimp sealed. The sidewall samples are stored at 50° C. The individual vials are analysed by gas chromatography for consumption of oxygen vs. a control at the prescribed time interval.

Intrinsic Viscosity

The intrinsic viscosity of intermediate molecular weight and low crystalline poly(ethylene terephthalate) and related polymers which are soluble in 60/40 phenol/tetrachloroethane was determined by dissolving 0.1 grams of polymer or ground pellet into 25 ml of 60/40 phenol/tetrachloroethane solution and determining the viscosity of the solution at 30° C.±0.05 relative to the solvent at the same temperature using a Viscotek viscometer. The intrinsic viscosity is calculated using the Billmeyer equation based upon the relative viscosity.

The intrinsic viscosity of high molecular weight or highly crystalline poly(ethylene terephthalate) and related polymers which are not soluble in phenol/tetrachloroethane was determined by dissolving 0.1 grams of polymer or ground pellet into 25 ml of 50/50 trifluoroacetic Acid/dichloromethane and determining the viscosity of the solution at 30° C.±0.05 relative to the solvent at the same temperature using a Type OC Ubbelohde viscometer. The intrinsic viscosity is calculated using the Billmeyer equation and converted using a linear regression to obtain results which are consistent with those obtained using 60/40 phenol/tetrachloroethane solvent. The linear regression is $$IV \text{ in } 60/40 \text{ phenol/tetrachloroethane} = 0.8229 \times IV \text{ in } 50/50 \text{ trifluoroacetic Acid/dichloromethane} + 0.0124$$

I claim:

1. A method for creating an oxygen scavenging particle comprising the steps of:
   (A) depositing a first compound which is a precursor compound from a liquid or gas phase onto an oxidizable particle; wherein said first compound is reacted with a second compound deposited on the oxidizable product which reacts to form a third compound which is an acidifying electrolyte on the oxidizable particle which produces a pH less than 7 in a dilute aqueous solution and substantially disassociates into positive and negative ions in the presence of moisture wherein the third compound is capable of initiating the reaction of the oxidizable particle with oxygen, wherein the second compound comprises $SO_3$ and is deposited on the particle from a gas stream;
   (B) wherein depositing is carried out under conditions sufficient for said second reactive compound to react with the first compound to form the third compound, and wherein the third compound is capable of initiating the reaction of the oxidizable particle with oxygen when the oxidizable particles comprising the third compound are exposed to water.

2. The method of claim 1 wherein the first compound is a metal hydroxide.

3. The process of claim 1, wherein the first compound is selected from the group consisting of sodium hydroxide and potassium hydroxide.

4. The method according to claim 1, wherein the particle is exposed to a further step wherein a water hydrolysable Lewis acid is deposited upon the oxidizable particle.

5. The method according to claim 4, wherein the water hydrolysable Lewis acid is selected from the group consisting of titanium tetrachloride, tin tetrachloride, and $POCl_3$, $SOCl_2$, $S_2Cl_2$, $PCl_3$, $PSCl_3$, $PBr_3$, $POBr_3$, $PSBr_3$, $PCl_5$, $SiCl_4$, $GeCl_4$, $SbCl_5$, $AlCl_3$, $FeCl2$, $FeCl_3$, $AlBr_3$, $SbCl_3$, $SbBr_3$, and $ZrCl_4$.

6. The method of claim 1 wherein the first component comprises NaOH or KOH and is deposited onto the oxidizable particle from solvent solution and then the particle has the solvent removed prior to depositing the second component.

7. A method for creating an oxygen scavenging particle comprising the steps of:
   (A) depositing a first compound which is a precursor compound from a liquid or gas phase onto an oxidizable particle; wherein said first compound reacts with a second compound which is $SO_3$ to form a third compound which is an acidifying electrolyte which produces a pH less than 7 in a dilute aqueous solution and substantially disassociates into positive and negative ions in the presence of moisture wherein the third compound is capable of initiating the reaction of the oxidizable particle with oxygen;
   (B) wherein depositing the first compound and the $SO_3$ is under conditions sufficient for the $SO_3$ to react with the first compound to form the third compound and wherein the third compound is capable of initiating the reaction of the oxidizable particles with oxygen when the oxidizable particle comprising the third compound are exposed to water, wherein the depositing of the first component is from solvent solution, and then the particle has the solvent removed prior to depositing the second component.

8. The method according to claim 7, wherein the particle is exposed to a further step wherein a water hydrolysable Lewis acid is deposited upon the oxidizable particle.

9. The method according to claim 8, wherein the water hydrolysable Lewis acid is selected from the group consisting of titanium tetrachloride, tin tetrachloride, and $POCl_3$, $SOCl_2$, $S_2Cl_2$, $PCl_3$, $PSCl_3$, $PBr_3$, $POBr_3$, $PSBr_3$, $PCl_5$, $SiCl_4$, $GeCl_4$, $SbCl_5$, $AlCl_3$, $FeCl2$, $FeCl_3$, $AlBr_3$, $SbCl_3$, $SbBr_3$, and $ZrCl_4$.

10. A method for creating an oxygen scavenging particle comprising the steps of:
   (A) depositing a first compound which is a precursor compound from a liquid or gas phase onto an oxidizable particle; wherein said first compound is reacted with a second compound deposited on the oxidizable product which reacts to form a third compound which is an acidifying electrolyte on the oxidizable particle which produces a pH less than 7 in a dilute aqueous solution and substantially disassociates into positive and negative ions in the presence of moisture wherein the third compound is capable of initiating the reaction of the oxidizable particle with oxygen;
   (B) wherein depositing is carried out under conditions sufficient for said second reactive compound to react with the first compound to form the third compound, and wherein the third compound is capable of initiating the reaction of the oxidizable particle with oxygen when the oxidizable particles comprising the third compound are exposed to water, wherein the particle is exposed to a further step wherein a water hydrolysable Lewis acid is deposited upon the oxidizable particle and wherein the depositing of the first component is from solvent solution, and then the particle has the solvent removed prior to depositing the second component.

11. The method of claim 10 wherein the first compound is a metal hydroxide.

12. The method of claim 10, wherein the water hydrolysable Lewis acid is selected from the group consisting of titanium tetrachloride, tin tetrachloride, and $POCl_3$, $SOCl_2$, $S_2Cl_2$, $PCl_3$, $PSCl_3$, $PBr_3$, $POBr_3$, $PSBr_3$, $PCl_5$, $SiCl_4$, $GeCl_4$, $SbCl_5$, $AlCl_3$, $FeCl_2$, $FeCl_3$, $AlBr_3$, $SbCl_3$, $SbBr_3$, and $ZrCl_4$.

* * * * *